(12) United States Patent
McCully

(10) Patent No.: US 8,220,488 B2
(45) Date of Patent: Jul. 17, 2012

(54) FLOW CONTROL VALVE WITH INTERNAL ISOLATION MEANS

(76) Inventor: Tim McCully, Houston, TX (US)

( * ) Notice: Subject to any disclaimer, the term of this patent is extended or adjusted under 35 U.S.C. 154(b) by 0 days.

(21) Appl. No.: 12/846,869

(22) Filed: Jul. 30, 2010

(65) Prior Publication Data

US 2012/0025117 A1  Feb. 2, 2012

(51) Int. Cl.
*F16K 5/10* (2006.01)
(52) U.S. Cl. ......... 137/614.17; 137/614.16; 137/614.18; 251/249.5
(58) Field of Classification Search ............... 251/249.5; 137/613, 614.16–614.18, 637.5
See application file for complete search history.

(56) References Cited

U.S. PATENT DOCUMENTS

| | | | | |
|---|---|---|---|---|
| 661,175 | A * | 11/1900 | Haigh | 137/637.5 |
| 719,528 | A * | 2/1903 | Steven | 137/637.5 |
| 1,656,355 | A * | 1/1928 | Huffmann | 137/637.5 |
| 1,659,797 | A * | 2/1928 | Wilson | 137/614.17 |
| 1,803,773 | A * | 5/1931 | Schmidt et al. | 251/160 |
| 1,841,050 | A * | 1/1932 | O'Stroske | 137/637.5 |
| 2,043,863 | A * | 6/1936 | Nordstrom | 137/246.18 |
| 2,997,057 | A * | 8/1961 | Toth | 137/315.25 |
| 3,064,938 | A | 11/1962 | Knox | |
| 3,133,722 | A * | 5/1964 | McGuire et al. | 251/309 |
| 3,316,846 | A * | 5/1967 | Bender | 417/510 |
| 3,595,474 | A * | 7/1971 | Humpert | 236/12.15 |
| 3,700,003 | A * | 10/1972 | Smith | 137/614.17 |
| 3,974,869 | A | 8/1976 | Abe | |
| 4,085,770 | A | 4/1978 | Woronwicz | |
| 4,273,152 | A * | 6/1981 | Freeman | 137/315.2 |
| 4,796,858 | A | 1/1989 | Kabel | |
| 4,848,398 | A | 7/1989 | Leach | |
| 5,193,573 | A | 3/1993 | Chronister | |
| 5,301,708 | A | 4/1994 | Schmidt | |
| 5,462,080 | A | 10/1995 | Plavidal | |
| 5,806,563 | A | 9/1998 | Rabby | |
| 5,918,624 | A | 7/1999 | Young | |
| 5,941,266 | A | 8/1999 | Henwood | |
| 5,947,151 | A | 9/1999 | Shafer | |
| 6,065,736 | A | 5/2000 | Hunt | |
| 6,302,373 | B1 | 10/2001 | Lee | |
| 6,488,261 | B1 | 12/2002 | Lee | |
| 6,701,951 | B1 | 3/2004 | Drinkwater | |
| 2007/0089790 | A1 | 4/2007 | Hecking | |
| 2007/0204917 | A1 | 9/2007 | Clayton | |
| 2008/0060706 | A1 | 3/2008 | Combs | |
| 2009/0211649 | A1 | 8/2009 | Miura | |

FOREIGN PATENT DOCUMENTS

| | | |
|---|---|---|
| CN | 2226183 | 5/1996 |
| JP | 07286678 | 10/1995 |
| PL | 370824 | 5/2006 |

* cited by examiner

*Primary Examiner* — John Fristoe, Jr.
*Assistant Examiner* — Marina Tietjen
(74) *Attorney, Agent, or Firm* — Law Office of Tim Cook P.C.

(57) ABSTRACT

A combination valve assembly comprises an inner valve nested within an outer valve. The outer valve comprises a housing and a closure, permitting full closure of the valve assembly. The inner valve comprises a housing and a closure, permitting flow control by the inner valve within requiring movement of the outer valve. The housing of the inner valve is keyed to the outer valve closure, so that movement of the outer valve closure rotates the inner valve housing and closure simultaneously.

9 Claims, 3 Drawing Sheets

FLOW CONTROL VALVE WITH INTERNAL ISOLATION MEANS

FIELD OF THE INVENTION

This invention relates generally to the field of flow control valves and, more particularly, to a combination valve assembly comprising a flow control valve with isolation means within the same housing.

BACKGROUND OF THE INVENTION

Valves play an important role in our everyday lives. Valves are integral to the operation of well-known fluid systems, such as showers, lavatories, and other systems and subsystems of plumbing structures in our homes. Valves are also integral to household appliances, including dishwashers, clothes washers, refrigerator icemakers, and others. Valves also form essential portions of outdoor water systems for watering plants and lawns, and even isolating a water main from a residence or business for maintenance and other purposes.

Further, valves play an unseen and accepted role in water treatment and distribution as well as sewage treatment facilities. Many different types of valves make up a portion of the infrastructure and social fabric of our daily lives, providing dependable service to the general public for decades.

Valves play an even more important role in industry. The pipeline and chemical processing industries would not exist without valves, yet the primary function of valves is to control flow of fluids. Valves control fluids with a low viscosity such as natural gas or fluids with a high viscosity such as hot tar in refineries. Fluids can be Newtonian such as water having little or no solids content or non-Newtonian such as coal slurry pipelines—which have high coal solids content.

Technology has changed the way valves are used. The advent of the programmable logic controller (PLC) has enabled capabilities within control valves that were nonexistent only a few years ago. Environmental regulations and health and safety regulations have required valves to be manufactured to higher quality standards, be more reliable, and easier to maintain.

Environmental regulations have changed the performance requirements of valves. Regulations now in effect require valves to operate and perform while maintaining a rigid standard for operating without leaking. In these regulatory programs, leaking valves must be maintained and repaired and records must be kept of the leaks found and the repairs made. Valves that cannot be fixed are placed on a shutdown list and repaired as a portion of a maintenance turnaround operation. In some cases, operating units must be shut down to effect repairs of leaking valves. If the leak percentages are too high for too long, valves are placed under a quality assurance program (QAP) that steps up the frequency for the checking for leaks and implements more stringent repair standards. More recent regulations require reporting for any release of volatile hydrocarbons to atmosphere and require annual reporting to the regulatory agencies for inclusion on the facility operating permit; these are known as recordable emissions and include all volatile organic compounds. Various regulations exist for volatile hydrocarbons based on their composition and can be any one of the following: volatile organic compounds (VOC's), hazardous air pollutants (HAP's), very hazardous air pollutants (VHAP's), highly reactive volatile organic compounds (HRVOC's), national environmental standard hazardous air pollutant (NESHAP's) and possibly more regulations based on more stringent local and state regulations.

In chemical processing industry facilities, elevated process temperatures make it difficult to maintain stem packing in control valves—constant stem packing leaks cause problems with leak percentages in leak detection and repair programs (LDAR) mandated in regulations and LDAR programs are required to maintain environmental permits. The present invention makes repair and/or replacement of these valves that have stem packing problems viable without having to resort to costly extraordinary repair methods.

Very small uncontrolled leakage of certain important commercial chemicals—notably benzene, butadiene, and others—must be reported due to the associated health hazards. Benzene and butadiene have a maximum quantity to be released to the atmosphere of 0.05 pounds—i.e. less than an ounce. Most of the facilities that handle benzene or butadiene have Title V permits and must self-report any violations. A Title V permit is a federal operating permit obtained under Title V of the Clean Air Act Amendments of 1990 and provisions in the act require the entity with the Title V permit to self-report violations of the Title V permit provisions.

One important application area of these requirements invention is the pipeline industry. Pipelines typically operate under the auspices of the Department of Transportation, however, there is a memorandum of understanding (MOU) between the United States Department of Transportation (USDOT) and the United States Environmental Protection Agency (USEPA), that the USEPA has jurisdiction over USDOT facilities in non-attainment areas. The USEPA divides regions in the USA that can meet ambient air quality standards as "attainment areas" and those regions that cannot meet ambient air quality standards "non-attainment" areas. The air quality standards are more stringent in "non-attainment" areas. This memorandum of understanding has changed the primary reporting agency for pipeline companies that operate in non-attainment areas—particularly those pipeline companies carrying finished products (SIC Code 4613) such as ethylene, propylene, butadiene, PP Mix (Propylene Propane Mix), and other products. In particular, both ethylene and propylene require extensive purging with the respective product due to the low concentrations of oxygen or nitrogen that can be present in the finished products and would violate the finished product specification. This means that any pipeline repair on the pipeline or valves in the pipeline can require days of downtime and considerable finished product has to be flared (burned) to atmosphere. In addition, pipelines interconnect the manufacturers of a particular chemical product to the next manufacturer in a chain of products, e.g., propylene is often further manufactured into propylene oxide in another facility say 60 miles away. Generally, pipeline valves isolate a given facility from the pipeline so that the facility can be shut down. However, when maintenance on the valve is required, the maintenance activities may shut down as many as thirty or forty plants within a given geographic area. The importance of being able to repair and maintain a valve while under pressure can save some major coordination problems and unnecessary downtime in multiple facilities. If one is unable to repair or maintain a valve under pressure, there is lost product, lost pipeline revenues, and adverse environmental impact. The present invention can mitigate many of these losses.

It is important to note that valves in pipeline service should be "full port" valves to allow the passage of pigs, swabs, brushes, and smart pigs through the pipeline for maintenance reasons. Generally, a full port valve is 0.125 inches larger than the size designation, e.g., a four inch (4") valve full port opening would be 4.125 inches in diameter.

Thus, there remains a need in the art for a valve assembly which enables an inner valve to be maintained, repaired, or replaced without de-pressuring the line in which it controls the flow. Such a valve assembly could play an important role in reducing maintenance costs, protecting the health exposures of employees, and reduce environmental emissions.

SUMMARY OF THE INVENTION

The present invention addresses these and other needs in the art by providing an inner valve nested within an outer valve. The outer valve comprises a housing and a closure, permitting full closure of the valve assembly. The inner valve comprises a housing and a closure, permitting flow control by the inner valve without requiring movement of the outer valve. The housing of the inner valve is keyed to the outer valve closure, so that movement of the outer valve closure rotates the inner valve housing and closure simultaneously.

These and other features and objects will be readily apparent to those of skill in the art from a review of the following detailed description.

BRIEF DESCRIPTION OF THE DRAWING FIGURES

DETAILED DESCRIPTION OF A PREFERRED EMBODIMENT

Figure 1:
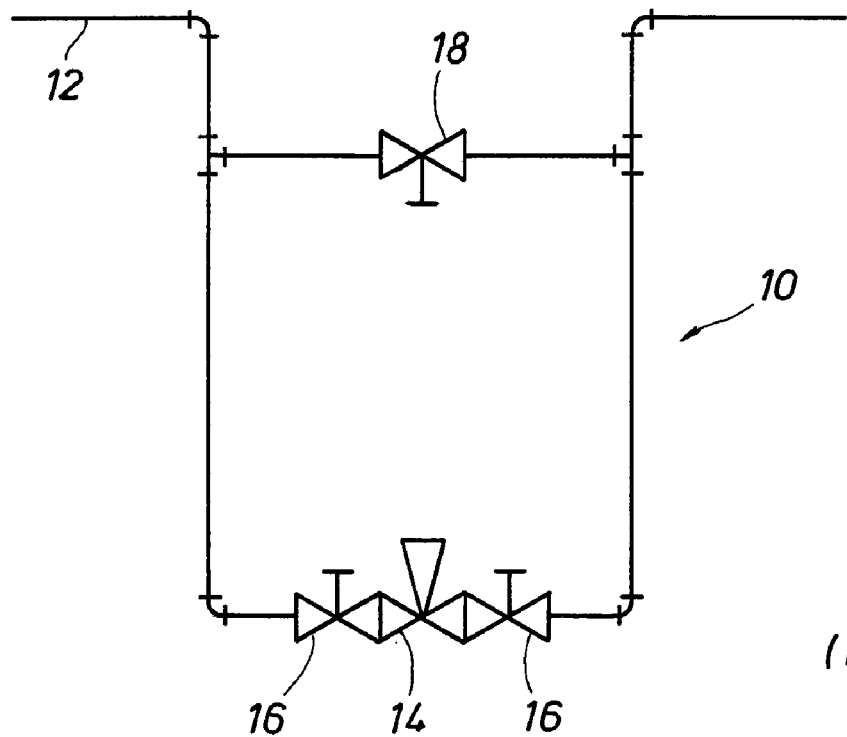
FIG. 1 is a schematic diagram of a fluid system including a known throttle valve with isolation and bypass valves.

FIG. 1 illustrates a fluid system 10 including a conduit 12 and a known throttle valve 14. The throttle valve 14 is commonly provided with isolation valves 16 on either side to provide complete isolation of the throttle valve. The system 10 also typically includes a bypass valve 18 to equalize pressure across the throttle valve 14 and isolation valves 16. During normal operation, the isolation valves 16 are fully opened, and the bypass valve 18 is shut, and the throttle valve 14 is operated as desired to control the flow of fluid within the conduit 12.

Those of skill in the art will recognize that the system illustrated in FIG. 1 calls for three separate structures for operation and isolation of the throttle valve 14. Further, improper operation of the isolation valves is almost inevitable, with one isolation valve 16 remaining inadvertently left open, thereby failing to fully isolate the throttle valve 14 when desired. It would therefore be desirable to include the isolation function within the same structure as the throttle valve. This would eliminate the drawback of the three separate valve structures, as well as ensuring the proper isolation of the throttle element when desired. The present invention is directed to filling this need in the art.

Figure 2:
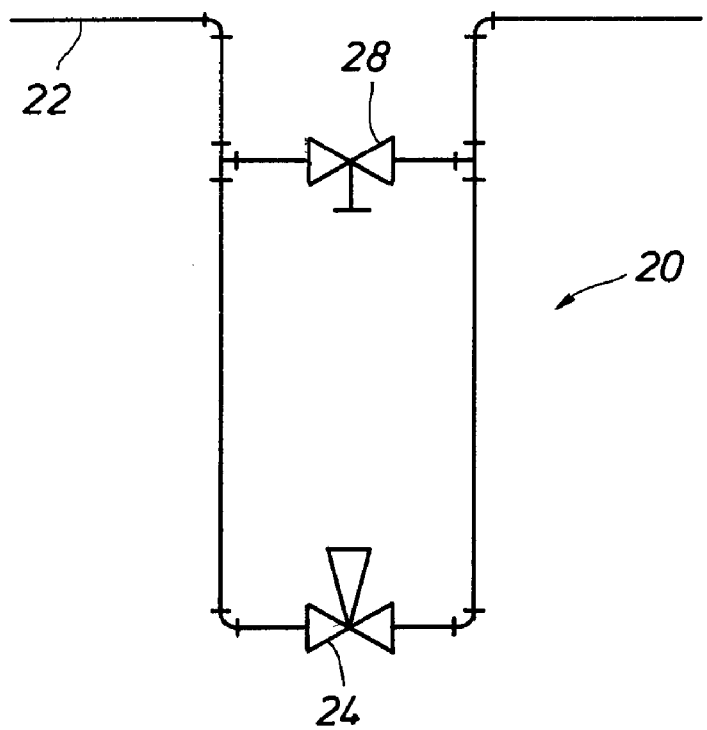
FIG. 2 is a schematic diagram of a fluid system including a throttle valve with integral isolation means within the same housing as the throttle valve.

FIG. 2 depicts a fluid system 20 comprising a combination flow control valve and isolation means 24 and a bypass valve 28. In a preferred embodiment, the flow control portion of the valve and isolation means 24 is a throttle valve, although other flow control structures may be desired within the scope and spirit of this invention. The valve and isolation means 24 is not isolated during normal operation, while the bypass valve 28 is shut. For maintenance or other operation, the valve and isolation means 24 is shut, as further described below, and the bypass valve 28 is opened. Thus, the valve and isolation means 24 reduces the number of piping components required and takes up less space than the assembly depicted in FIG. 1. Further, the bypass function may be incorporated into the valve and isolation means 24, thereby further reducing separate structural elements.

Figure 3:
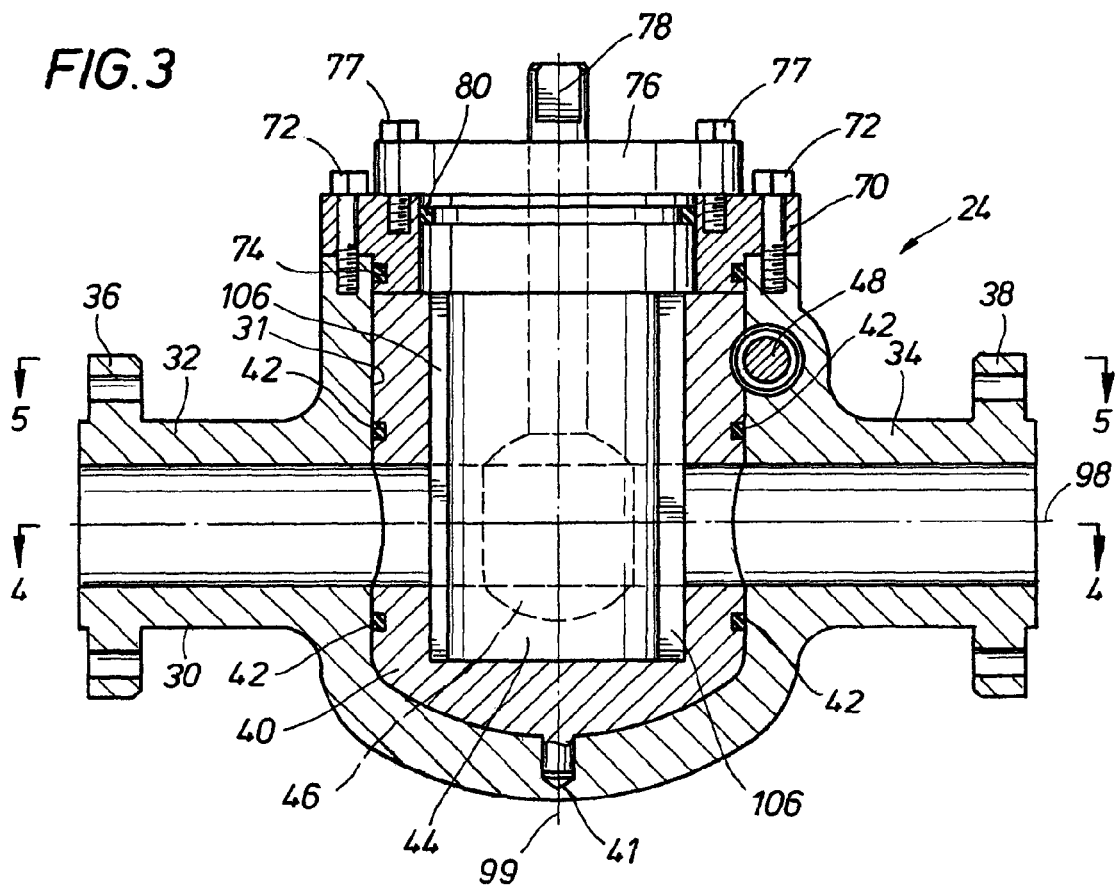
FIG. 3 is a side section view of a throttle valve with integral isolation means.

FIG. 3 illustrates a presently preferred embodiment of such a valve 24. The valve comprises an outer valve housing 30 including pipe segments 32 and 34 which terminate in flanges 36 and 38, respectively. The flanges 36 and 38 permit the coupling of the valve 24 into the conduit 12 in a manner known in the art.

Figure 5:
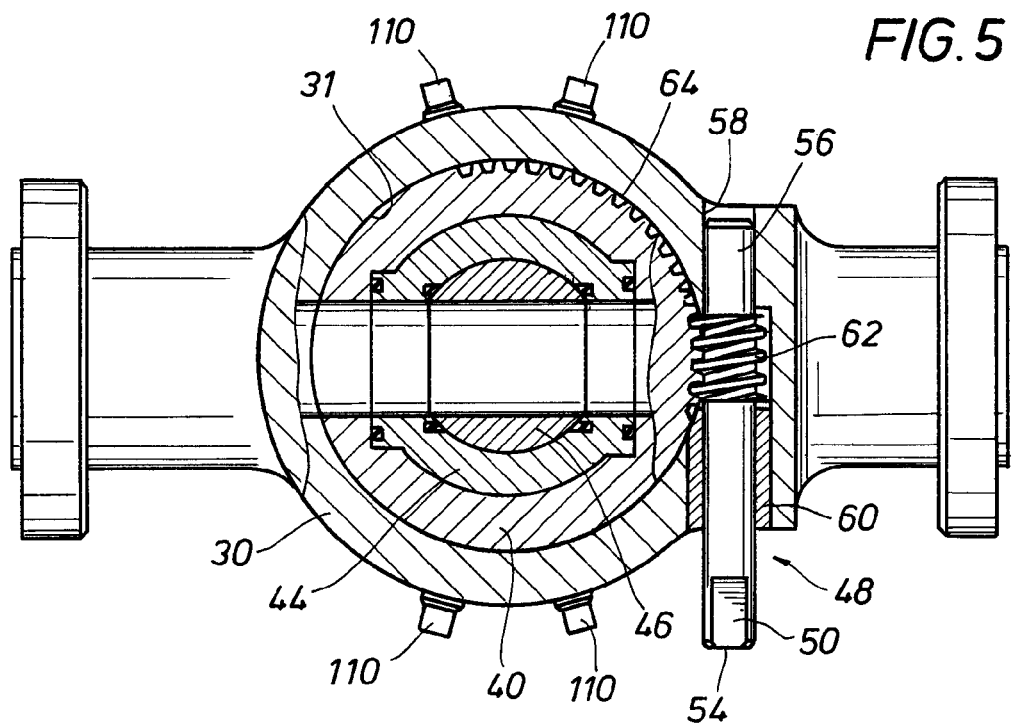
FIG. 5 is a top section view of the valve of FIG. 3, taken along section lines 5-5 with the valve in the open (operable) condition.
Figure 6:
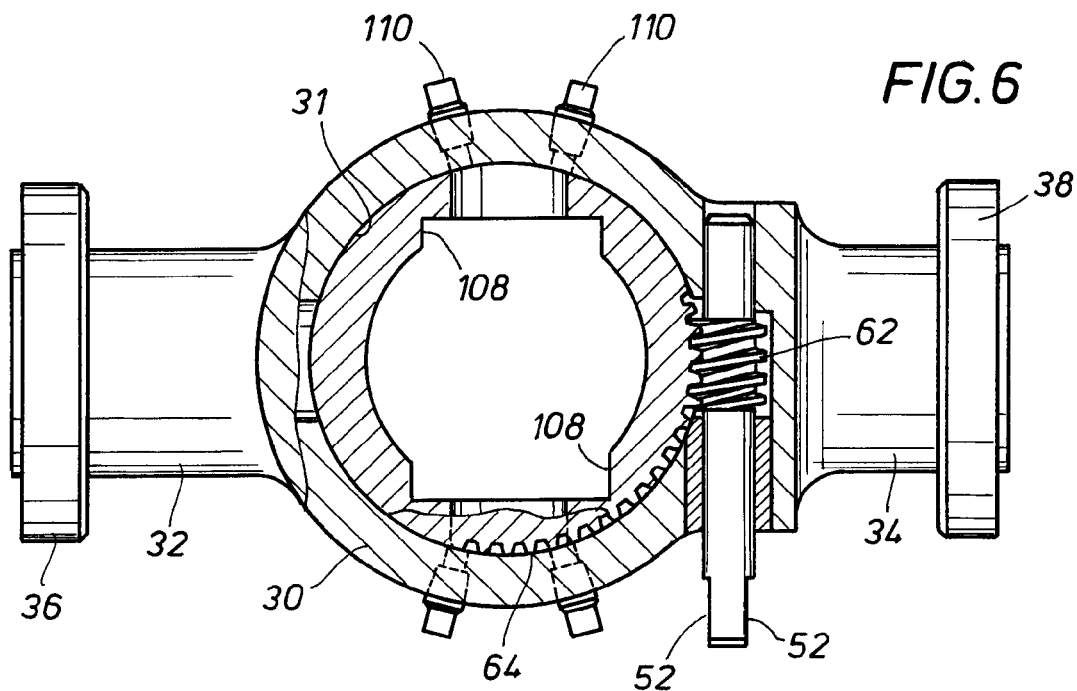
FIG. 6 is a top section view of the valve of FIG. 3, taken along section lines 5-5 with the inner valve removed for maintenance and the valve in the shut (inoperable) condition.

Nested within the outer valve housing 30 is an outer valve closure 40 within a vertically oriented chamber 31 of the outer valve housing (see also FIGS. 5 and 6). The outer valve closure 40 is rotated by an operator in a manner described below in order to totally shut off the valve 24 for maintenance or other required operation. The outer valve closure 40 is preferably a 90° operating type having a ball valve or plug valve shape, as determined by the designer. The outer housing and outer valve closure are sealed by a pair of seal rings 42 to prevent fluid from leaking between the outer valve housing 30 and the outer valve closure 40. The outer valve closure 40 includes a center pinion 41 which acts as a stable center of rotation for the outer valve closure.

Nested within the outer valve closure 40 is an inner valve housing 44. The inner valve housing 44 serves as the body of an inner valve closure 46. The inner valve closure may rotate or move up and down, as desired, to control the flow of fluid through the valve 24 during normal operation.

Referring now to FIGS. 3, 5, and 6, positioned between the outer housing 30 and the outer valve closure 40 is an outer valve closure mechanism 48. In a presently preferred embodiment, the outer valve closure mechanism includes an operating stem 50 comprising an elongate rod. On the proximal end 54 of the stem 50, a pair of flats 52 may be formed to accommodate a wrench or other operable tool to manipulate the stem 50. The distal end 56 of the stem 50 is retained within a cylinder 58 formed in the outer valve housing 30. Also, a sleeve 60 retains within the outer valve housing 30. In between the sleeve 60 and the distal end 56 of the stem is a worm gear 62. The worm gear is operably positioned to engage a set of gear teeth 64 formed in the outer valve closure. Thus, turning the stem 50 rotates the worm gear, which in turn opens or shuts the outer valve closure 40.

The stem 50 is shown in FIGS. 5 and 6 aligned along an axis that is perpendicular to the axis of the outer valve housing. Alternatively, the stem may be aligned along an axis that is parallel to the axis of the outer valve housing, extending above or below the outer valve housing. The proximal end 54 of the stem may also be made flush with the surface that it penetrates, and provided with a drive opening such as an Allen wrench, for example.

Referring once again to FIG. 3, the outer valve housing 30 is capped with an outer valve bonnet 70. The outer valve bonnet 70 is mounted to the outer valve housing 30 with a set of bolts 72, for example. The outer valve bonnet 70 is sealed to the outer valve housing with a seal ring 74. An inner valve bonnet 76 bolts with a set of bolts 77 or otherwise fastens to the outer valve bonnet 70 to retain the inner valve housing 44 and the inner valve closure 46 within the outer valve housing 30.

An inner valve stem 78 is integrally formed with or joined to the inner valve closure 46. The inner valve stem 78 penetrates the inner valve bonnet 76 so that a tool may be applied to inner valve stem, thereby controlling flow through the valve 24. Other operable mechanisms may also be applied to the inner valve stem, such as automatically or computer controlled operators. The inner valve stem 78, the outer valve housing and closure, and the inner valve housing and closure, are all arranged co-axially along an axis 99. Finally, the inner valve bonnet 76 is sealed to the outer valve bonnet 70 with a seal ring 80 to prevent fluid leakage between the inner and outer valve bonnets.

Figure 4:
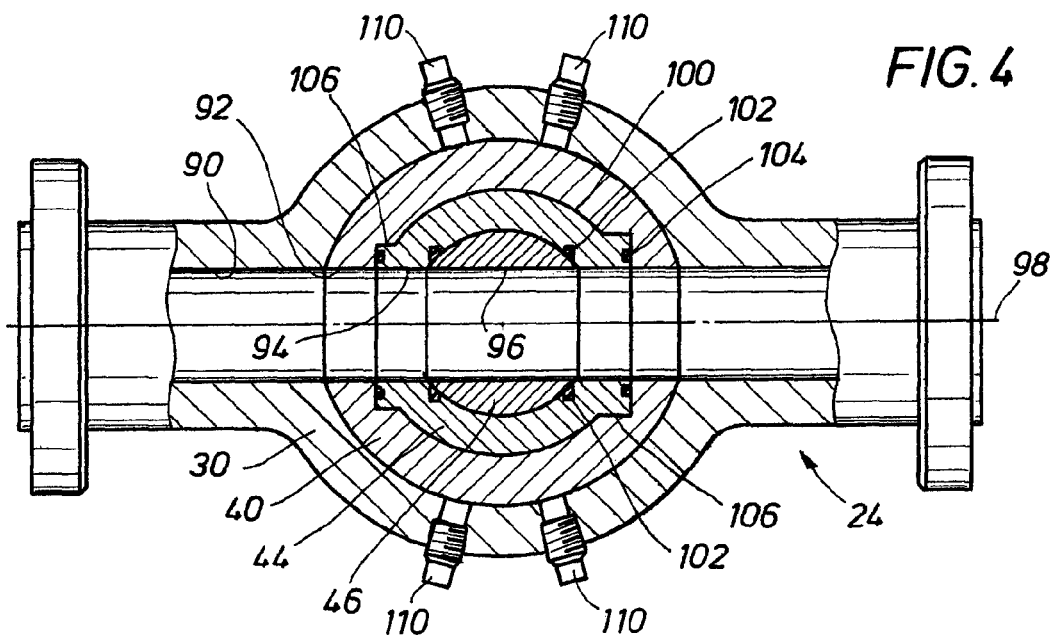
FIG. 4 is a top section view of the valve of FIG. 3, taken along section lines 4-4.

Referring now to FIG. 4, the outer valve housing 30 defines a conduit 90 for the conduct of fluid through the valve 24. In a similar fashion, the outer valve closure 40 defines a conduit 92; the inner valve housing 44 defines a conduit 94; and the inner valve closure 46 defines a conduit 96. In normal operation, at full flow, the conduits 90, 92, 94, and 96 are aligned along a common axis 98 for unobstructed flow of fluid through the valve. Also, the inner valve closure may be adjusted, independent of any of the outer valve housing, the outer valve closure, or the inner valve housing, to throttle the flow of fluid.

Note that the inner valve closure defines an outer surface 100 that is irregular, i.e. non-circular, in shape so that the inner valve closure cannot turn relative to the outer valve closure 40. In a presently preferred embodiment, the inner valve housing 44 defines a pair of opposing flanges 106, each of which extends into a respective cavity 108 (see FIG. 6), although other arrangements may be used within the scope and spirit of this invention such that the outer valve closure is keyed to the inner valve housing. The inner valve closure 46 and the inner valve housing 44 are sealed with a set of seal rings 102 and the inner valve housing 44 and the outer valve closure are seal with a set of seal rings 104.

The outer valve housing 30 also includes a number of purge or bleeder valves or couplings (purge couplings) 110. The purge couplings 110 provide for the safe decommissioning and startup of valve operation without endangering personnel health and safety by exposure to toxic chemicals or violating environmental regulations. The only volume that has to be bled and/or purged is the volume used by the inner valve housing and closure.

As previously described, the inner valve housing 44 moves with the outer valve closure 40 to assure that the inner valve closure 46 does not leak or malfunction regardless of the position of the inner valve closure 46 when the outer valve closure 40 is opened or closed. Since the inner valve closure 46 may be in the "closed" position, it is important that the valve 24 be bled or purged from both sides via a bleeder or valve inserted in the purge couplings 110. Two purge couplings 110 may be provided on each side, as shown in FIG. 6, to assure the valve internals can be purged to the maximum degree possible for environmental and health and safety reasons. The purge couplings are shown "as shipped" with a "bull plug". The valve technician installs the bleeder and/or purge valve at the purge couplings when the valve is installed and placed in service. This is to prevent someone or something hitting the smaller bleeder or purge valve and breaking them off the valve 24. Such practice is common in the chemical process and pipeline industry.

The purge couplings may also serve notice to maintenance personnel that the outer valve is nearing a full shut-off position by slightly opening the bleeder or purge valve to allow a small amount of the inner-contained liquid to bleed or leak to demonstrate the outer valve location. While only two total bleed or purge locations are needed, two other locations are provided which can be used for a boroscope access to inspect the valve for inner wear, if desired.

Thus, in its simplest form, the combination valve assembly described herein is simply a "valve within a valve". This means that there are two ways to control flow through the valve. The outer valve blocks flow so that the inner valve can be maintained. The inner valve controls normal operating flow operations such as opening, closing, throttling, or controlling flow based on the design and operating characteristics of the inner valve and the fluid in the flowline.

The principles, preferred embodiment, and mode of operation of the present invention have been described in the foregoing specification. This invention is not to be construed as limited to the particular forms disclosed, since these are regarded as illustrative rather than restrictive. Moreover, variations and changes may be made by those skilled in the art without departing from the spirit of the invention.

I claim:

1. A combination valve assembly comprising:
    an outer valve housing defining a conduit therethrough arranged along a first, substantially horizontal axis, the outer valve housing conduit having a diameter, and further defining a chamber arranged along a second, substantially vertical axis;
    an outer valve closure nested within the outer valve housing and arranged for rotational movement within the outer valve housing around the vertical axis;
    an inner valve housing nested within and keyed to the outer valve closure;
    an inner valve closure nested within the inner valve housing and arranged for rotational movement within the inner valve housing around the vertical axis;
    an outer valve closure mechanism between the outer valve housing and the outer valve closure, wherein the outer valve closure mechanism comprises:
        an elongate stem defining an axis perpendicular to the first and second axes, the stem penetrating the outer valve housing, the stem defining a worm gear; and
        a set of gear teeth defined on the outer valve closure for operable engagement with the worm gear.

2. The assembly of claim 1, wherein the outer valve closure defines an outer valve closure conduit having a diameter the same as the diameter of the outer valve housing conduit.

3. The assembly of claim 2, wherein the inner valve housing defines an inner valve housing conduit having a diameter the same as the diameter of the outer valve housing conduit and the outer valve closure conduit.

4. The assembly of claim 3, wherein the inner valve closure defines an inner valve closure conduit having a diameter the same as the diameter of the outer valve housing conduit, the outer valve closure conduit, and the inner valve housing conduit.

5. The assembly of claim 1, further comprising an outer valve bonnet mounted to the outer valve housing.

6. The assembly of claim 5, further comprising an inner valve bonnet mounted to the outer valve bonnet.

7. The assembly of claim 6, further comprising an inner valve stem extending from the inner valve closure and extending through the inner valve bonnet.

8. The assembly of claim 1, wherein the outer valve housing, the outer valve closure, the inner valve housing, and the inner valve closure are nested coaxially along a second, substantially vertical axis.

9. The assembly of claim 1, wherein the inner valve housing and the inner valve closure together define a throttle valve.

* * * * *